United States Patent
Trainer et al.

(10) Patent No.: US 7,573,243 B2
(45) Date of Patent: Aug. 11, 2009

(54) GENERATOR CONTROL ARRANGEMENT

(75) Inventors: David R Trainer, Derby (GB); Lihua Hu, Derby (GB); Michael P Hirst, Derby (GB)

(73) Assignee: Rolls-Royce plc, London (GB)

( * ) Notice: Subject to any disclaimer, the term of this patent is extended or adjusted under 35 U.S.C. 154(b) by 242 days.

(21) Appl. No.: 11/705,463

(22) Filed: Feb. 13, 2007

(65) Prior Publication Data

US 2007/0194760 A1 Aug. 23, 2007

(30) Foreign Application Priority Data

Feb. 23, 2006 (GB) ................... 0603593.5

(51) Int. Cl.
*H02P 9/48* (2006.01)
*H02P 9/46* (2006.01)

(52) U.S. Cl. .............................. 322/24; 322/25; 322/37; 322/99

(58) Field of Classification Search .................. 322/20, 322/21, 22, 23, 24, 25, 37, 19, 27, 28, 99
See application file for complete search history.

(56) References Cited

U.S. PATENT DOCUMENTS

| 4,044,296 | A | * | 8/1977 | Dhyanchand et al. | ......... 322/25 |
|---|---|---|---|---|---|
| 4,931,717 | A | * | 6/1990 | Gray et al. | ................... 323/299 |
| 5,153,498 | A | * | 10/1992 | Parro | ............................ 322/25 |
| 5,225,764 | A | * | 7/1993 | Falater | ........................ 322/28 |
| 5,252,926 | A | * | 10/1993 | Menegoli | .................... 324/545 |
| 5,285,147 | A | * | 2/1994 | Rashid | ........................ 322/28 |
| 6,825,644 | B2 | * | 11/2004 | Kernahan et al. | ........... 323/283 |
| 7,154,248 | B2 | * | 12/2006 | Velhner et al. | ................ 322/24 |
| 7,170,263 | B2 | * | 1/2007 | Yamamoto et al. | ............ 322/59 |
| 7,235,952 | B2 | * | 6/2007 | Maehara | ...................... 322/24 |
| 7,239,116 | B2 | * | 7/2007 | Tang | .......................... 323/282 |
| 7,285,937 | B2 | * | 10/2007 | Asada | .......................... 322/24 |

FOREIGN PATENT DOCUMENTS

JP     4 236 200 AB     8/1992

* cited by examiner

*Primary Examiner*—Nicholas Ponomarenko
(74) *Attorney, Agent, or Firm*—Jeffrey S. Melcher; Manelli Denison & Selter PLLC

(57) ABSTRACT

A generator control arrangement for an electrical power generator, the arrangement comprising a controller arranged to regulate output voltage from a generator to a target value, the controller including a voltage comparator for comparing a presented voltage with a desired output voltage, the presented voltage derived in a transfer comparator by combination of a reference voltage value and an error value between a reference electrical current value and a measured electrical current value subject to a processor gain whereby the processor gain can be specifically set at zero to enable control by voltage or the processor gain can be specifically set at greater than zero to enable control by electrical current.

11 Claims, 2 Drawing Sheets

PRIORART
Fig.1.
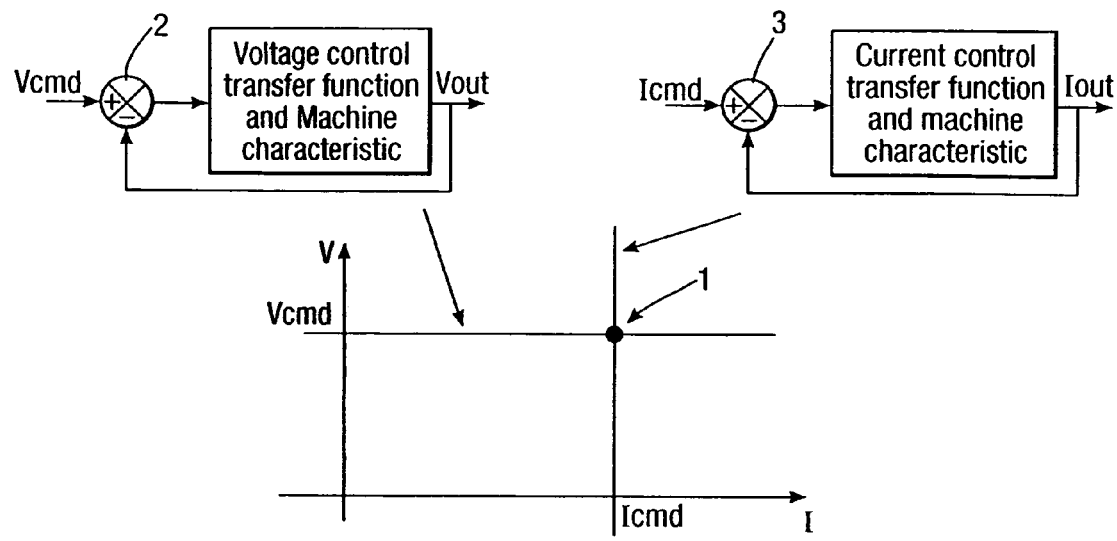

GENERATOR CONTROL ARRANGEMENT

FIELD OF THE INVENTION

The present invention relates to a generator control arrangement and more particularly to a control arrangement for electrical power generators utilised in gas turbine engines.

BACKGROUND OF THE INVENTION

Use of electrical power generators is quite extensive with a wide range of applications. It will be understood that these electrical power generators typically take drive from a primary mover in the form of an engine and therefore create electrical power for control and actuation of that engine as well as for other functions ancillary to the engine or vehicle or structure in which the engine is located. With regard to gas turbine engines it will be appreciated that a significant number of such engines are utilised in aerospace applications. In such circumstances a gas turbine engine is utilised in order to drive the electrical power generator to provide electrical power to both the engine for control and actuator functions as well as with respect to providing electrical power for the aircraft itself.

Electrical power generators are an inherent feature of modern aero engines to generate electrical power for local engine control loads and also to provide electrical power for wider demands within the aircraft in general. It is known that parallel operation of generators can bring benefits in terms of system efficiency, weight and availability. Having a number of electrical power generators ensures greater reliability of electrical power supply should one generator or its system fail and also in terms of meeting the variable electrical demand levels in an aircraft at different stages of aircraft cycles, e.g. take-off, landing and cruising. In order to achieve parallel operation of generators a suitable control method needs to be adapted to prevent conflicts in electrical power provision occurring between the different electrical power generators. Such previous electrical generator control arrangements have required that one of the generators operates with a voltage control and the other electrical generator or generators with electrical current control. FIG. 1 below provides a schematic illustration of the differing control mechanisms in order to achieve a steady state point for an electrical power generator arrangement or system. This steady point is depicted as 1 in the graphic representation. This target value 1 as indicated is achieved by respective electrical generators operating to achieve validation controlled via voltage referencing and via electrical current referencing respectively. In such circumstances, as can be seen, a reference or command voltage Vcmd is compared in a voltage comparator 2 with an output voltage Vout. The comparator 2 will generally subtract the output voltage Vcmd so that any deviation or error is determined by a voltage transfer function and machine characteristic in order to adjust the electrical generator to maintain the desired output voltage at the reference value Vcmd. Similarly with regard to electrical current control, a current comparator 3 compares a reference or desired electrical current Icmd with an output electrical current Iout. This comparison is normally by subtraction of one from the other such that any error is determined by a current control transfer function and machine characteristic such that the electrical generator thereby controlled is altered in terms of its performance in order to ensure that Iout is equal to Icmd.

It will be understood that the voltage control and current control use different control loops and therefore require separate implementation. However, parallel operation of the electrical generators may be temporarily abandoned, either specifically to meet electrical demands or under fault conditions when one or more of the electrical generators may malfunction. In such circumstances the electrical generators must be able to operate independently. Furthermore, it is important that the electrical system voltage is maintained at all times so that it is necessary for all electrical generators to be able to revert to voltage control mode. In such circumstances at least some of the electrical generators must be able to operate with both voltage and electrical current control modes except the one normally voltage controlled. It will also be understood that the two modes of control operation must be able to be switched without interrupting the normal operation of the generators. In such circumstances, when parallel operation is abandoned an electrical generator operating under electrical current control should be switched to voltage control quickly, otherwise a large unpredictable voltage transient may result.

SUMMARY OF THE INVENTION

In accordance with aspects of the present invention there is provided a generator control arrangement for an electrical power generator, the arrangement comprising a controller arranged to regulate output voltage from a generator to a target value, the controller including a voltage comparator for comparing a presented voltage with a desired output voltage, the presented voltage derived in a transfer comparator by combination of a reference voltage value and an error value between a reference electrical current value and a measured electrical current value subject to a processor gain whereby the processor gain can be specifically set at zero to enable control by voltage or the processor gain can be specifically set at greater than zero to enable control by electrical current.

Typically, the value of the processor gain provides a slope characteristic between a target voltage and measured electrical current whose inclination is dependent upon the specific value of the processor gain toward the target value. Generally, the specific value of the processor gain is set to provide an appropriate level of sensitivity in terms of the error value for efficient operation of the generator control arrangement.

Also, in accordance with aspects of the present invention, there is provided an electrical power generator including a generator control arrangement as controlled above.

Further, in accordance with aspects of the present invention, there is provided an electrical arrangement for electrical power generation, the arrangement comprising at least two electrical generators and at least one of the electrical generators having a generator control arrangement as described above.

Typically, all the electrical generators in the electrical generator arrangement will have a generator control arrangement as described above.

Further, in accordance with aspects of the present invention, there is provided a gas turbine engine incorporating an electrical generator as described above.

Additionally, in accordance with aspects of the present invention, there is provided a gas turbine engine incorporating a generator arrangement as described above.

Further, in accordance with aspects of the present invention, there is provided a method of control of an electrical power generator, the method comprising:
(a) determining an electrical current error by comparison of a measured electrical current and a reference electrical current value;
(b) providing a reference voltage value;
(c) applying a specific processor gain to the electrical current error value and comparing the product of applying the specific processor gain to the electrical current error value with the reference voltage value to provide a target voltage value;

(d) comparing the target voltage value with an output voltage value;

(e) setting the specific processor gain to zero to provide control by reference to the voltage reference value or setting the specific processor gain to greater than zero to provide control by reference to the reference electrical current value.

Typically, a switch is provided to alternate between the specific processor gain value at zero and a specific processor gain value greater than zero. Possibly, the switch allows variation in the specific processor gain value greater than zero.

BRIEF DESCRIPTION OF THE DRAWINGS

An embodiment in accordance with aspects of the present invention will now be described by way of example only with reference to the accompanying drawings in which:

FIG. 1 is a schematic depiction of a prior art generator control arrangement.

DETAILED DESCRIPTION OF THE INVENTION

As indicated above, generator control arrangements which operate upon voltage control regulation are known. These voltage control arrangements effectively compare the output voltage Vout with the target voltage Vtgt in order that any divergence can be identified by a controller device and adjustments made to the generator in order to achieve the desired voltage output, that is to say Vtgt=Vout. In such circumstances these voltage control arrangements incorporate feedback to a comparator where the comparison between Vtgt and Vout is made.

In accordance with aspects of the present invention, the Vtgt value is provided through a transfer comparator. This transfer comparator will receive a reference voltage value consistent with the target voltage value Vtgt along with a product of an error factor between a reference electrical current and an actual measured electrical current subject to a specific processor gain.

Figure 2:
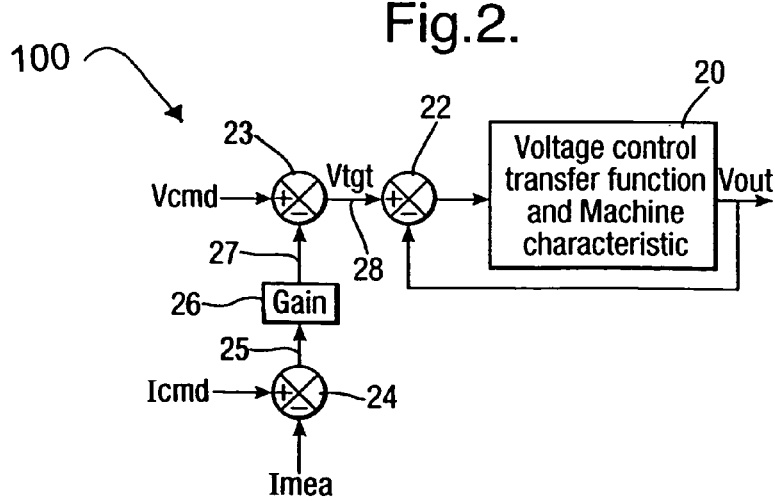
FIG. 2 is a schematic depiction of a generator control arrangement in accordance with aspects of the present invention.

FIG. 2 illustrates a generator control arrangement, or controller 100, in accordance with aspects of the present invention as a schematic block diagram. Thus, as indicated above, a voltage control arrangement is provided comprising a voltage comparator 22 and a voltage control transfer function and machine characteristic regulating device 20. Thus, a controller 100, in accordance with aspects of the present invention, incorporates the voltage comparator 22 and the regulator 20 such that through a voltage sensor the output voltage Vout is determined and the comparator 22 compares that output voltage Vout with the target voltage value Vtgt. The comparator 22 will essentially subtract Vtgt from Vout such that if Vout is of the desired target voltage value there will be zero difference and therefore the regulator 20 will not be required to make adjustments to the generator in order to achieve the desired voltage Vout.

The present invention also provides within the controller 100 a transfer comparator 23. The transfer comparator 23 receives signals representative of a reference voltage Vcmd which will generally be the value desired for Vtgt and therefore the voltage output Vout from the controller 100 and the arrangement. The comparator 23 will also receive a product of any error between a reference electrical current value Icmd representative of the desired electrical current value for correct operation of the generator and an actual measured electrical current Imea. The comparison between Icmd and Imea will be performed in an electrical current comparator 24 and will again generally be a subtraction of the measured electrical current Imea from the desired electrical current value Icmd. The error value 25 will be presented to a gain device 26 typically in the form of an operational amplifier with regard to the electrical signal produced by the comparator 24 indicative of the error between Icmd and Imea. The gain device 26 will present the product of a specific processor gain value multiplying the error value 25 as a product value 27 to the transfer comparator 23.

This transfer comparator 23 as indicated above will combine Vcmd and the product 27 in order to provide a value Vtgt presented to the voltage comparator 22.

In such circumstances it will be appreciated that, dependent upon the specific processor gain provided in the device 26 there will be varying divergence from the value of Vcmd being that of Vtgt as presented to the voltage comparator 22.

Aspects of the present invention specify that the gain device 26 can be specifically set such that the specific processor gain is either zero or greater than zero. In such circumstances it will be appreciated if the processor gain is set at zero then there will be a zero multiplier with regard to the error 25 so that the product 27 will be zero and therefore the value 28 provided by the transfer comparator 23 will be the reference voltage value Vcmd. In such circumstances, the generator control arrangement, or controller 100, depicted in FIG. 2 will therefore operate in accordance with voltage control in that configuration where gain=zero. However, where the gain of the device 26 is greater than zero, it will be understood that the error 25 will therefore be multiplied by the device 26 in the product 27 presented to the transfer comparator 23. In such circumstances, the only instance when the product 27 will again be zero is when there is no error between Icmd and Imea so that the gain in this situation is therefore multiplied by zero.

Figure 3:
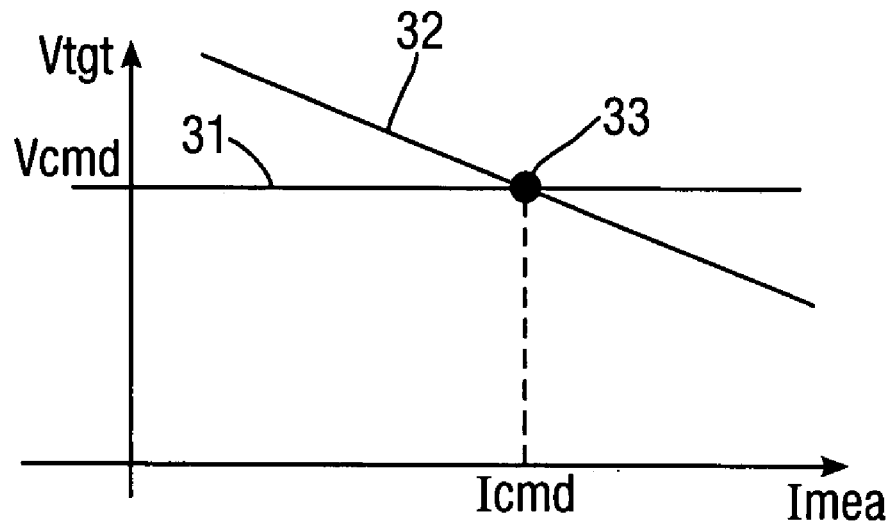
FIG. 3 is a graphic representation of voltage against electrical current for a generator control arrangement in accordance with aspects of the present invention.

In the above circumstances, there are only two scenarios when Vtgt is equal to the reference voltage value Vcmd, that is to say when the gain=zero and the measured electrical current Imea is equivalent to the reference electrical current Icmd. FIG. 3 illustrates these relationships.

In FIG. 3, as indicated previously, a graphical representation of Vtgt, that is to say the desired target voltage, to be sustained by the generator against measured electrical current Imea is depicted. Thus, line 31 represents a situation where there is zero gain such that there is a constant control voltage reference value Vcmd across the whole range of electrical current Imea. This is the situation as described above and is common for voltage controlled generator control arrangements depicted in FIG. 1.

Slope 32 represents the effect upon Vtgt as a result of a gain greater than zero. The angle of inclination of the slope 32 will be dependent upon the value of processor gain provided in the device 26. In such circumstances, as indicated above, the gain value will multiply any error in the Imea from the reference electrical current value Icmd. When Icmd is greater than Imea, it will be noted that Vtgt is greater than the reference voltage Vcmd whilst when Imea is greater than Icmd the value of Vtgt is less than Vcmd. It is only when Icmd is equal to Imea that there is incident at a point 33 with the value of Vcmd.

In the above circumstances, using the generator control arrangement, or controller 100, as depicted in FIG. 2 and in accordance with the schematic graph representation given in FIG. 3 that a generator can be controlled both in terms of voltage and in terms of electrical current. Switching between the control regimes will be achieved by switching the gain device 26 from a zero gain to a value of gain greater than zero in order to respectively alternate between voltage control and electrical current control. This can be done electronically and quickly.

It will be understood that the voltage comparator 22 as indicated will compare the Vtgt value with the voltage output Vout. In such circumstances, if there is variance between Vout and Vtgt, when in the voltage control regime, then the regulator device 20 will be arranged to adjust the associated electrical generator in order to achieve the desired voltage output, that is to say a value consistent with Vcmd.

When in the electrical current control regime, it will be understood that there are two essential conditions, namely, when there is no error between the reference electrical current Icmd and the measured electrical current Imea and situations where there is an error between Icmd and Imea. When there is no error the product 27 will be zero and therefore Vcmd will still be presented by the transfer comparator 23 as Vtgt for comparison by the voltage comparator 22 with the output voltage Vout. Where there is error, this will be multiplied by the processor gain and therefore Vtgt will be on the slope 32 above or below the point 33. In such circumstances, the voltage regulator 20 will be able to identify either the different value of Vtgt for comparison with Vout or the discrepancy between Vtgt and Vout will itself indicate to the regulator 20 that an adjustment is required in the electrical current of the generating machine in order to maintain Vout at the desired value Vcmd.

In this generator control arrangement, or controller 100, the target voltage that the control system will achieve is dependent on the voltage command and also the error between the current command with the measured operating current. When the gain in the current error is set to zero, this control is the same as the normal voltage control system. When the gain is higher than zero, the target voltage will become a tilted line with a negative slope. The crossing point of the two control characteristics will be the operational point of the system where the current command is achieved for the generator with a slope control. For generation onto a stiff network (i.e. the generator being controlled is small compared to the total generation capacity), stable operation will be achieved at any point along the slope depending on the actual system voltage.

By the above approach it will be appreciated that electrical current control can be achieved with a generator controlled by a voltage controlled loop so that only one common control regime is required for parallel operation of generators. Change of operation is easily achieved by setting the gain in the gain device 26 to zero or a value greater than zero as required for each regime.

In comparing an electrical current control regime, it will be noted that the voltage transients experienced by an arrangement in accordance with aspects of the current invention will be much smaller and predictable when paralleling is abandoned and a system is operated as separate and isolated generators.

Figure 4:
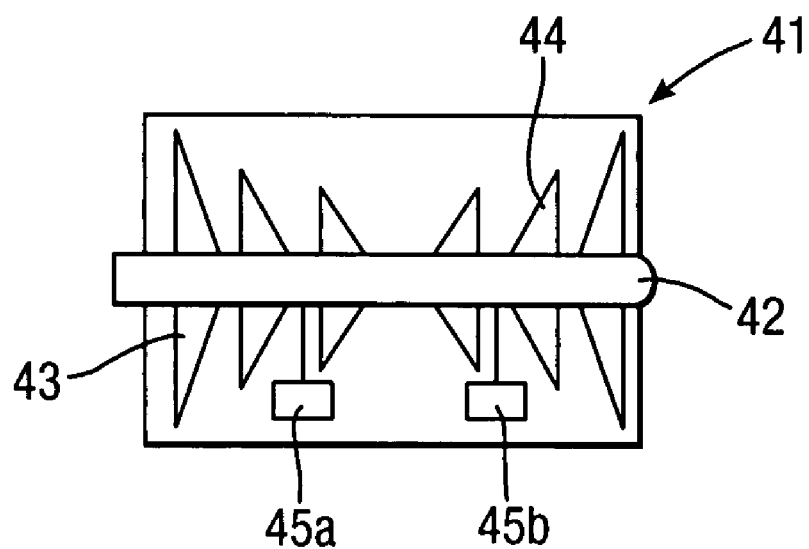
FIG. 4 is a schematic illustration of a gas turbine engine incorporating a control arrangement in accordance with aspects of the present invention.

FIG. 4 is a schematic cross-section of a gas turbine engine 41 incorporating a shaft 42 upon which a number of compressors 43 and turbines 44 are located. The shaft 42 provides a drive mechanism for a number of electrical generators 45 utilised in order to provide electrical power for engine 41 control and actuation as well as typically other electrically demands of an aircraft or machinery or structure associated with the engine 41. As indicated above, it has been found for efficiency provision of more than one electrical generator 45 allows flexibility as well as built-in reliability should one generator fail or adjustments are required for varying electrical power demands. In such circumstances, an electrical generator 45a may fail through a malfunction or be switched off if electrical power demand alters or the thrust requirements or shaft 42 loading should alter. In such circumstances, as indicated above, parallel operation of electrical generators 45a, 45b necessitates matching of the voltage and electrical current in order to meet requirements. In particular, the electrical voltage must be maintained for system requirements. This electrical voltage is maintained in accordance with the generator control arrangement described above.

The electrical generator control arrangement, or controller 100, in accordance with aspects of the present invention operates in accordance with a method whereby defining a reference voltage value for the necessary rated or sustained voltage for an electrical system is set or determined and then by comparison of the output voltage from the generators 45 with that reference voltage control achieved by adjusting the generators as required. The method also requires measuring the electrical current provided by the generators and by comparison with a reference electrical current value an error value or quotient determined. In accordance with the method, this error value or quotient is acted upon by a processor gain in a controller of the arrangement. In such circumstances as indicated above, if the processor gain is set at zero then irrespective of any error in the electrical current values the generator will still be controlled by the voltage reference value but the generators can also be controlled by reference to the reference electrical current value in that when the processor gain is set to greater than zero the error is multiplied to the slope 32 (FIG. 3) and therefore the arrangement can determine divergence by the measured electrical current Imea from the reference electrical current value and appropriate adjustments made. However, when there is no electrical current error, that is to say it is zero, it will be understood that again, irrespective of the value of processor gain, the arrangement will be controlled by the reference voltage value and so appropriate control of the output voltage achieved.

As indicated above, typically the present generator control arrangement, or controller 100, will act upon a plurality of generators, that is to say two or more electrical generators, but the generator control arrangement, or controller 100, could also be applied to a single electrical generator as required.

The present generator control arrangement, or controller 100, and method of control of an electrical power generator has particular applicability with regard to aerospace applications. As indicated, electrical power generation efficiency is improved by providing a number of electrical power generators and also having such a number of electrical power generators will provide sufficient safety margin in terms of electrical power generation in a fail-safe mode.

Modifications and alterations to the embodiments of the present invention will be understood by those skilled in the art. Thus, the processor gain value will typically be chosen to ensure that the angular inclination of the slope 32 (FIG. 3) is sufficient to cause sufficient deviation to be noticeable by the controller 100 to stimulate necessary sensitivity for adjustment of the generator. Generally the gain value will be fixed but it is also possible that the gain device 26 as part of the controller 100 of the present generator control arrangement may allow for adjustment in the degree of gain greater than zero which will be utilised in difference phases of generator operation.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A generator control arrangement for an electrical power generator, the arrangement comprising a controller arranged to regulate output voltage from a generator to a target value, the controller including a voltage comparator for comparing a presented voltage with a desired output voltage, the presented voltage derived in a transfer comparator by combination of a reference voltage value and an error value between a reference electrical current value and a measured electrical current value subject to a processor gain whereby the processor gain can be specifically set at one of zero, to enable control by voltage, or greater than zero to enable control by electrical current.

2. An arrangement as claimed in claim 1 wherein the value of the processor gain provides a slope characteristic between a target voltage and measured electrical current whose inclination is dependent upon the specific value of the processor gain toward the target value.

3. An arrangement as claimed in claim 1 wherein the specific value of the processor gain is set to provide an appropriate level of sensitivity in terms of the error value for efficient operation of the generator control arrangement.

4. An electrical power generator incorporating a generator control arrangement as claimed as claim 1.

5. An electrical power arrangement for electrical power generation, the arrangement comprising at least two electrical generators and at least one of the electrical generators having a generator control arrangement as claimed in claim 1.

6. An arrangement as claimed in claim 5 wherein all the electrical generators in the electrical generator arrangement have a generator control arrangement for an electrical power generator, the arrangement comprising a controller arranged to regulate output voltage from a generator to a target value, the controller including a voltage comparator for comparing a presented voltage with a desired output voltage, the presented voltage derived in a transfer comparator by combination of a reference voltage value and an error value between a reference electrical current value and a measured electrical current value subject to a processor gain whereby the processor gain can be specifically set at one of zero, to enable control by voltage, or greater than zero to enable control by electrical current.

7. A gas turbine engine incorporating an electrical generator as claimed in claim 4.

8. A gas turbine engine incorporating a generator arrangement as claimed in claim 5.

9. A method of control of an electrical power generator, the method comprising:
   (a) determining an electrical current error by comparison of a measured electrical current and a reference electrical current value;
   (b) providing a reference voltage value;
   (c) applying a specific processor gain to the electrical current error value and comparing the product of applying the specific processor gain to the electrical current error value with the reference voltage value to provide a target voltage value;
   (d) comparing the target voltage value with an output voltage value;
   (e) setting the specific processor gain to zero to provide control by reference to the voltage reference value or setting the specific processor gain to greater than zero to provide control by reference to the reference electrical current value.

10. A method as claimed in claim 9 wherein a switch is provided to alternate between the specific processor gain value at zero and a specific processor gain value greater than zero.

11. A method as claimed in claim 9 wherein the switch allows variation in the specific processor gain value greater than zero.

* * * * *